US008539486B2

(12) United States Patent
Cain, III et al.

(10) Patent No.: US 8,539,486 B2
(45) Date of Patent: Sep. 17, 2013

(54) TRANSACTIONAL BLOCK CONFLICT RESOLUTION BASED ON THE DETERMINATION OF EXECUTING THREADS IN PARALLEL OR IN SERIAL MODE

(75) Inventors: Harold W. Cain, III, Hartsdale, NY (US); Gheorghe C. Cascaval, Carmel, NY (US); Maged M. Michael, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 1096 days.

(21) Appl. No.: 12/504,925

(22) Filed: Jul. 17, 2009

(65) Prior Publication Data
US 2011/0016470 A1    Jan. 20, 2011

(51) Int. Cl.
*G06F 9/46* (2006.01)
*G06F 13/00* (2006.01)

(52) U.S. Cl.
USPC ........... 718/100; 718/101; 718/102; 718/104; 711/147

(58) Field of Classification Search
None
See application file for complete search history.

(56) References Cited

U.S. PATENT DOCUMENTS

| | | |
|---|---|---|
| 2005/0086446 A1 | 4/2005 | McKenney et al. |
| 2007/0186215 A1* | 8/2007 | Rajwar et al. ................. 718/102 |
| 2007/0198521 A1 | 8/2007 | McKenney |
| 2008/0120300 A1* | 5/2008 | Detlefs et al. ..................... 707/8 |
| 2010/0138841 A1* | 6/2010 | Dice et al. ..................... 718/107 |

OTHER PUBLICATIONS

Mankin et al. ("Software transactional memory for multicore embedded systems", Jun. 19-20 2009, ACM, pp. 1-9).*
Sonmez et al. ("profiling transactional memory applications on an atomic block basis: a Haskell case study", Barcelona supercomputing center, Jan. 2, 2009, pp. 1-14).*
Craig ("building FIFO and priority—queuing spin locks from atomic swap", University of Washington, 1993, pp. 1-29).*
Bobba, Jayaram et al., "Performance Pathologies in Hardware Transactional Memory", ACM, ISCA '07, Jun. 9-13, 2007, 11 pages.
Herlihy, Maurice et al., "Transactional Memory: Architectural Support for Lock-Free Data Structures", Proceedings of the 20th Annual International Symposium on Computer Architecture, May 1993, pp. 289-300.
Scherer, III, William N. et al., "Advanced Contention Management for Dynamic Software Transactional Memory", ACM, PODC'05, Jul. 17-20, 2005, 9 pages.

* cited by examiner

*Primary Examiner* — Jennifer To
*Assistant Examiner* — Caroline H Arcos
(74) *Attorney, Agent, or Firm* — Francis Lammes; Stephen J. Walder, Jr.; Brian Verminski

(57) ABSTRACT

Mechanisms are provided for handling conflicts in a transactional memory system. The mechanisms execute threads in a data processing system in a first conflict resolution mode of operation in which threads execute conflicting transactional blocks speculatively. The mechanisms determine, for a transactional block, if the first conflict resolution mode of operation is to be transitioned to a second conflict resolution mode of operation in which threads accessing conflicting transactional blocks are executed serially and non-speculatively. Moreover, the mechanisms execute a thread that accesses the transactional block using the second conflict resolution mode of operation in response to the determination indicating that the first conflict resolution mode of operation is to be transitioned to the second conflict resolution mode of operation.

18 Claims, 4 Drawing Sheets

TRANSACTIONAL BLOCK CONFLICT RESOLUTION BASED ON THE DETERMINATION OF EXECUTING THREADS IN PARALLEL OR IN SERIAL MODE

BACKGROUND

The present application relates generally to an improved data processing apparatus and method and more specifically to mechanisms for performing transactional conflict resolution based on locality of threads executing conflicting transactions.

Transactional memory attempts to simplify concurrent or parallel programming by allowing a group of load and store instructions to execute in an atomic manner, i.e. it is guaranteed that either (1) all instructions of the transaction complete successfully or (2) no effects of the instructions of the transactions occur. With atomic transactions, the instructions of the transaction appear to occur all at once in a single instant between invocation and results being generated.

Hardware transactional memory systems may have modifications to the processors, caches, and bus protocols to support transactions or transaction blocks, i.e. groups of instructions that are to be executed atomically as one unit. Software transactional memory provides transactional memory semantics in a software runtime library with minimal hardware support.

As described in Bobba et al., "Performance Pathologies in Hardware Transactional Memory," ISCA '07, Jun. 9-13, 2007, a programmer can invoke a transaction in a multi-threaded application and rely on the transactional memory system to make its execution appear atomic in a global serial order. Bobba et. al discusses conflict resolution policies in transactional memory systems, however, the concept of transactional memory was introduced by Herlihy and Moss "Transactional Memory: Architectural Support for Lock-Free Data Structures," Proceedings of the 20th Annual International Symposium on Computer Architecture, pp. 289-300, May 1993.

Transactional memory systems seek high performance by speculatively executing transactions concurrently and only committing transactions that are non-conflicting. A conflict occurs when two or more concurrent transactions access the same piece of data, e.g. a word, block, object, etc., and at least one access is a write. Transactional memory systems may resolve some conflicts by stalling one or more transactions.

Transactional blocks are typically demarcated in a program with special transaction begin and end annotations. Transactional blocks may be uniquely identified by a static identifier, e.g., the address of the first instruction in the transactional block. Dynamically, multiple threads can concurrently enter a transaction block, although that transactional block will still share the same static identifier.

SUMMARY

In one illustrative embodiment, a method, in a data processing system having plurality of processors and a memory, is provided for handling conflicts in a transactional memory system. The method comprises executing, by the plurality of processors, threads in the data processing system in a first conflict resolution mode of operation in which threads execute conflicting transactional blocks speculatively. The method further comprises determining, by a processor of the plurality of processors, for a transactional block, if the first conflict resolution mode of operation is to be transitioned to a second conflict resolution mode of operation in which threads accessing conflicting transactional blocks are executed serially and non-speculatively. Moreover, the method comprises executing, by the processor, a thread that accesses the transactional block using the second conflict resolution mode of operation in response to the determination indicating that the first conflict resolution mode of operation is to be transitioned to the second conflict resolution mode of operation.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise plurality of processors and a memory coupled to the plurality of processors. The memory may comprise instructions which, when executed by the plurality of processors, cause the plurality of processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
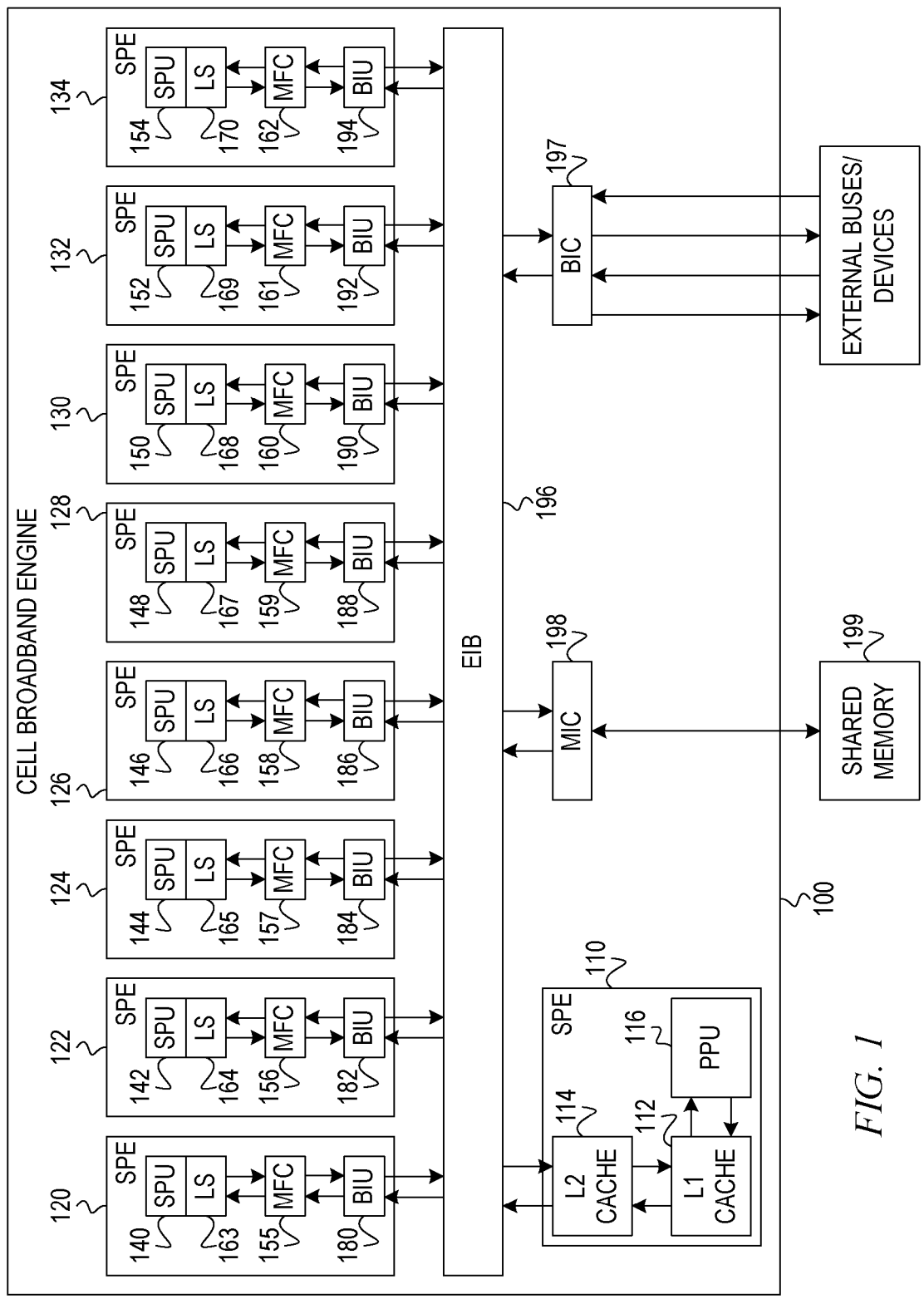
FIG. 1 is an example diagram of a data processing system in which aspects of the illustrative embodiments may be implemented.

The illustrative embodiments provide a mechanism for performing transactional memory conflict resolution based on the locality of the threads requesting access to the transactional block. With the mechanisms of the illustrative embodiments, a proactive nearest neighbor conflict resolution methodology is utilized. This resolution methodology uses two modes of operation on a per static transactional block basis. A first mode of operation, sometimes referred to as an "optimistic" mode of operation, all transaction blocks are considered able to be executed concurrently by multiple threads. In a second mode of operation, sometimes referred to as a "pessimistic" mode of operation, transaction blocks are classified into colors or classifications and transactions of a particular classification or color are serialized using a lock mechanism.

During execution in the optimistic mode of operation, when a conflict is detected between any two threads, a winner thread is chosen using any suitable selection mechanism. The winning thread continues execution while the losing thread aborts its transaction, i.e. any changes to state are rolled back and the transaction is retried, possibly waiting some period of time before being retried. A profile is created over time from which the abort rate of optimistic execution for a particular transaction block is calculated. The profile also contains a summary of the other transactional blocks with which each transactional block has conflicted. Thus, the profile may be used to classify transactions into classes, which may be identified by "colors," that group transaction blocks that conflict with one another, i.e. transaction blocks that conflict are classified into the same class or "color."

Operation transitions from the first mode of operation to the second mode of operation in response to the abort rate of a transaction block exceeding a threshold value. That is, when the abort rate meets or exceeds the threshold value, the operation transitions from an optimistic mode to a pessimistic mode. In the pessimistic mode of operation, a lock guards the entrance to the transactional block's class or color. Thus, only one thread can be executing one or more transactional blocks of the same class or color. In this way, execution is proactively throttled to prevent failed speculation from consuming system resources.

When a thread completes execution of a transactional block in the pessimistic mode of operation, one or more threads may be waiting to enter that transactional block. However, rather than using a strictly fair first-come-first serve policy for admitting a waiting thread, the transactional memory system of the illustrative embodiments instead uses a locality determination to admit a thread which is executing in an execution environment that shares one or more resources with the execution environment of the thread that completed execution of the transactional block in the pessimistic mode, e.g., shares one or more levels of cache or the like. Counter mechanisms may be used to determine when to cease using the locality mechanism and the pessimistic mode of operation such that other threads are not starved with regard to access to the transactional block.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Because the mechanisms of the illustrative embodiments are directed to handling conflicts in thread requests to access a same transactional block in a transactional memory system, the illustrative embodiments are particularly well suited for use in a multi-processor system where one or more threads may be executed on one or more of the processors in the multi-processor system. Alternatively, the illustrative embodiments may be implemented in a data processing system having a single processor, but multiple cores, where a thread executes on each core of the processor. In short, any computing device architecture in which two or more threads may be competing for access to a transactional block at substantially a same time may make use of the mechanisms of the illustrative embodiments without departing from the spirit and scope of the illustrative embodiments. For purposes, of this description, however, it will be assumed, for purposes of an example, that the computing device is a heterogeneous multi-processor system, such as the Cell Broadband Engine available from International Business Machines Corporation of Armonk, N.Y.

FIG. 1 is an exemplary block diagram of a data processing system in which aspects of the present invention may be implemented. The exemplary data processing system shown in FIG. 1 is an example of the Cell Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The local memory or local store (LS) 163-170 is a non-coherent addressable portion of a large memory map which, physically, may be provided as small memories coupled to the SPUs 140-154. The local stores 163-170 may be mapped to different address spaces. These address regions are continuous in a non-aliased configuration. A local store 163-170 is associated with its corresponding SPU 140-154 and SPE 120-134 by its address location, such as via the SPU Identification Register, described in greater detail hereafter. Any resource in the system has the ability to read/write from/to the local store 163-170 as long as the local store is not placed in a secure mode of operation, in which case only its associated SPU may access the local store 163-170 or a designated secured portion of the local store 163-170.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system in which the CBE 100 is implemented may take the form of any of a number of different data processing systems including client computing devices, server computing devices, a tablet computer, laptop computer, telephone or other communication device, a personal digital assistant (PDA), or the like. In some illustrative examples, the data processing system in which the CBE 100 is provided may be a portable computing device which is configured with flash memory to provide non-volatile memory for storing operating system files and/or user-generated data, for example. Essentially, the data processing system in which the CBE 100 is provided may be any known or later developed data processing system without architectural limitation.

In accordance with the illustrative embodiments, the CBE 100, or other multi-core or multi-processor data processing system, implements either a hardware transactional memory system, a software transactional memory system, or a combination of hardware and software transactional memory system. Furthermore, with the mechanisms of the illustrative embodiments, the transactional memory system utilizes a multiple operational mode mechanism for handling conflicts between threads targeting the same transactional block of instructions with spatial and/or temporal locality being utilized in at least one of the operational modes to determine which thread is given access to the targeted transactional block.

For example, a transactional block of instructions may be defined in a computer program by a programmer in a manner generally known in the art. In the multi-core or multi-processor system, multiple threads may attempt to access this transactional block of instructions stored in a shared memory structure, such as shared memory 199 or, in some cases, a shared local store of a SPE. The transactional block of instructions may be identified, for example, by the address of the first instruction in the transactional block and a size or length of the block. If more than one thread executing on one or more processors or cores attempts to access the same transactional block of instructions at substantially the same time, a conflict may arise and a determination must be made as to which thread should be allowed to persist its state changes while the other thread(s) must abort or roll back any changes made. The mechanisms of the illustrative embodiments address such conflicts with a mechanism for determining how to resolve such conflicts. Alternatively, threads may access different transactional blocks that access the same memory locations and therefore conflict.

Figure 2:
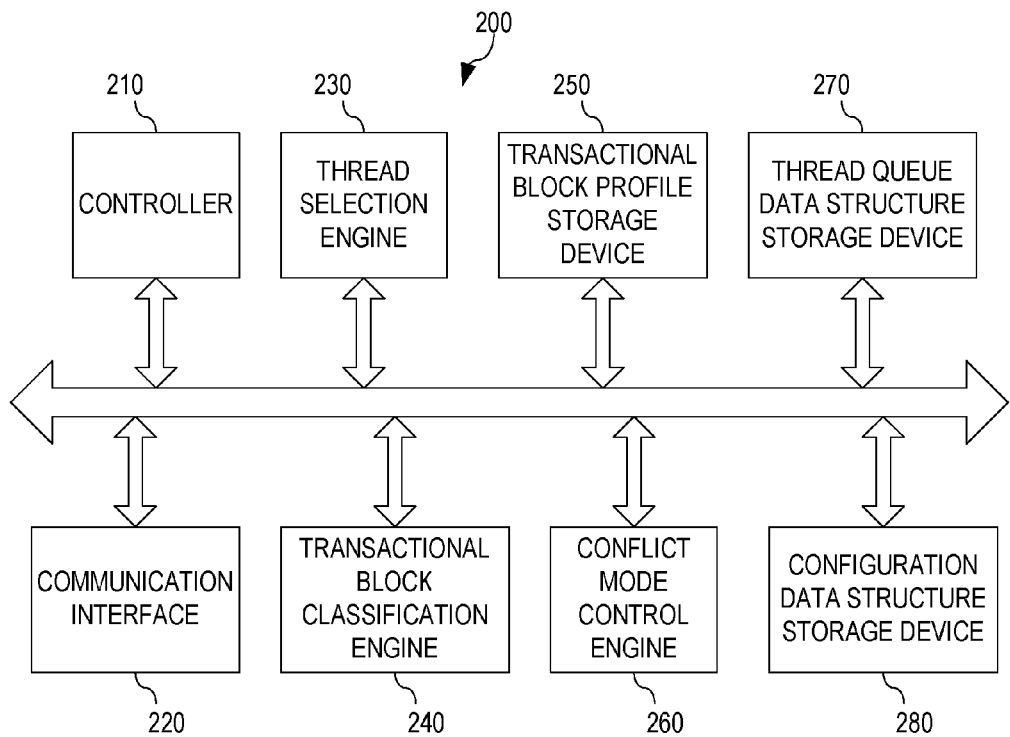
FIG. 2 is an example block diagram illustrating the primary operational elements of one illustrative embodiment.

FIG. 2 is an example block diagram illustrating the primary operational elements of one illustrative embodiment. The elements shown in FIG. 2 may be implemented in hardware, software, or any combination of hardware and software. In one illustrative embodiment, the elements of FIG. 2 are implemented a computer program instructions executed by one or more processing devices in conjunction with a memory structure storing transactional blocks of instructions for access by multiple threads on a plurality of processors. For example, the mechanisms of the illustrative embodiments may be implemented as computer program instructions executing on a control processor, such as PPU 1 16 in FIG. 1, a dedicated processor, such as one of the SPEs in FIG. 1, the memory interface controller (MIC) 198, or may be embodied as a separate hardware device or instructions executing on a separate processor device not shown in FIG. 1.

It should be appreciated that the block diagram of FIG. 2 is only an example and many modifications may be made to the block diagram without departing from the spirit and scope of the illustrative embodiments. For example, many of the blocks in FIG. 2 may be combined or may be distributed across a plurality of processing devices.

As shown in FIG. 2, the transactional memory system 200 of the illustrative embodiments comprises a controller 210, a communication interface 220, a thread selection engine 230, a transactional block profile storage device 240, a transactional block classification engine 250, a conflict mode control engine 260, a thread queue data structure storage device 270, and a configuration data structure storage device 280. The controller 210 controls the overall operation of the transactional memory system 200 and orchestrates the operation of the other elements 220-280 in accordance with the operations described hereafter. The communication interface 220 provides a mechanism through which the controller 210 and other elements 230-280 may communicate with shared memory, cache memory, processors, and the like. The thread selection engine 230 operates in the manner described hereafter to select a thread that is permitted to access a transactional block. The thread selection engine 230 also serves to prioritize threads requesting access to a transactional block based on locality information from the configuration data structure storage device 280.

The transactional block profile storage device 240 stores profiles for transactional blocks indicating, among other information, a number of times that threads have had to be aborted when attempting to access the transactional block or access a same portion of data as the transactional block at substantially a same time, e.g., concurrently. The transactional block classification engine 250 operates in one mode of operation of the transactional block system 200 to classify transactional blocks for purposes of controlling a lock to the class of transactional blocks. The conflict mode control engine 260 determines if and when to modify an operational mode, also referred to herein as a conflict resolution mode of operation, of the transactional memory system. The thread queue data structure storage device 270 stores queues of threads requesting access to a transactional block, e.g., there may be a separate queue for each transactional block listing the thread identifiers of threads requesting access to the particular transactional block. The order of threads in the thread queue may be determined by the thread selection engine 230 based on locality information obtained from the configuration data structure storage device 280.

With the mechanisms of the illustrative embodiments, initially, a proactive nearest neighbor conflict resolution methodology is utilized. This resolution methodology uses two modes of operation on a per static transactional block basis. A first mode of operation, sometimes referred to as an "optimistic" mode of operation, all transaction blocks are considered able to be executed concurrently by multiple threads. In a second mode of operation, sometimes referred to as a "pessimistic" mode of operation, transaction blocks are classified into colors or classifications and transactions of a particular classification or color are serialized using a lock mechanism.

Thus, initially, a request from a first thread executing on a first processor is received for accessing a transactional block. The transactional memory system 200 is initially operating in an "optimistic" or first conflict resolution mode of operation in which all threads are considered to be able to execute concurrently. Thus, in response to the first thread accessing the transactional block, the controller 210 generates a transactional block profile entry in the transactional block profile storage device 250. The entry stores information regarding the transactional block including, for example, a transactional block identifier, a classification or color of the transactional block, a summary of other transactional blocks with which the transactional block has conflicted, and one or more abort counters for counting a number of times a thread executing the transactional block has had to be aborted due to a conflict with another thread executing the transactional block concurrently or at substantially the same time.

If a second thread executing on a second thread accesses the same transactional block, the execution of the same transactional block by the second thread is permitted to occur under this first conflict resolution mode of operation, i.e. the "optimistic" mode of operation. While this second thread is permitted to execute the transactional block, a conflict is still detected and the transactional block system determines how to handle the conflict by selecting a thread to allow to persist its state changes while other threads are aborted and have their state changes rolled back before being persisted. Alternatively, the second thread may execute a different set of instructions as part of another transactional block which attempt to update the same data as the first thread executing the first transactional block of instructions.

In response to the detection of a conflict by the controller 210, while operating in the first conflict resolution mode of operation, the thread selection engine 230 may use any known or later developed mechanism for selecting between threads during a transactional memory system conflict without departing from the spirit and scope of the illustrative embodiments. That is, under the first conflict resolution mode of operation, conflicts in a transactional memory system are resolved in a manner generally known in the art. However, with the mechanisms of the illustrative embodiments, information about the transactional block, and the resolution of conflicts with regard to the transactional block, are stored in the transaction profile entry for the transactional block, in the transactional block profile storage device 250. This information may later be used by the conflict mode control engine 260 to determine if and when to change the conflict resolution mode of operation to a second conflict resolution mode of operation, also referred to as the "pessimistic" mode of operation. Moreover, this information may be used by the controller 210 to determine how to handle locks in this second conflict resolution mode of operation, as discussed hereafter.

Whenever, in the first conflict resolution mode of operation, there is a conflict between any two threads with regard to accessing the transactional block, or two or more threads executing different instructions but updating the same data, and the conflict is resolved by the thread selection engine 230 with one of the thread's state changes being aborted or rolled back, the controller 210 increments an abort counter associated with the transactional block profile entry in the transactional block profile storage device 250. In addition, a transactional block identifier for any conflicting transactional blocks may be stored in the transactional block profile entry.

Periodically, the controller 210 may scan entries in the transactional block profile storage device 250 and compare counter values to a predetermined threshold. If the counter values equal or exceed the threshold, then the corresponding transactional block's conflict resolution mode of operation may be transitioned to the second conflict resolution mode of operation. Alternatively, such comparisons may be made each time a counter for a transactional block profile entry is incremented, such that as soon as a transactional block's corresponding abort counter value meets or exceeds the predetermined threshold, the conflict resolution mode of operation for that transactional block is transitioned to the second mode of operation. Once the conflict resolution mode of operation is transitioned, by the conflict mode control engine 260, to the second conflict resolution mode of operation, the abort counter may be reinitialized. Alternatively, such reinitialization of the abort counter may be performed in response to a transition back to the first conflict resolution mode of operation, as described hereafter.

In the second conflict resolution mode of operation, i.e. the "pessimistic" mode of operation, the transactional block is assigned a classification or "color" with a corresponding classification or color identifier being set in the transactional block profile entry. If the transactional block has other conflicting transactional blocks that have already been given a classification or "color" (simply referred to as a "color" hereafter), then the same color is assigned to the current transactional block by storing the color identifier in the transactional block profile entry. Thus, those transactional blocks that conflict with one another are provided with the same color or classification for purposes of controlling the execution of these transactional blocks in a serial manner. That is, in the second conflict resolution mode of operation, transactions in a class identified by a color are serialized using a locking mechanism as described hereafter. If the execution of the current transaction block, i.e. the "transaction," has been conflicting with another transaction that has not already been assigned a color, then the current transaction block and the conflicting transaction block are assigned a same new unique color.

In the second conflict resolution mode of operation, a locking mechanism is used to control execution of transactional blocks associated with colors or classifications, i.e. a lock is assigned to each color of transactional blocks. A thread must obtain the lock on the color of the transactional block before it is permitted to execute the instructions of the transactional block. Once a thread obtains the lock on the color, the thread may execute any of the transactional blocks of that color. Other threads must wait for the current thread to complete its execution of the transactional block and signal a handoff of the lock for that color to the waiting thread before they can obtain the lock and execute their own transactional blocks classified in that color.

Once a thread has completed execution of a transactional block in that color, and does not need to execute other instructions in transactional blocks of that color, the thread releases the lock so that it may be acquired by another thread. The allocation of locks may be performed by the thread selection engine 230 based on its thread selection decisions. That is, the thread releasing the lock may consult the thread queue data structure for that color of transactional blocks to identify a next waiting thread and signal that thread that the lock is to be handed off to it. In this way, the mechanisms of the illustrative embodiments proactively throttle execution to prevent failed speculation from consuming system resources.

As mentioned above, the thread to which the lock is handed off after completion of the transactional block execution by a current thread may be determined based on a thread queue data structure associated with the color or classification of transactional blocks. The thread queue data structure stores a prioritized list of competing threads for the color or classification of transactional blocks. In response to transitioning to the second conflict resolution mode of operation for a particular transactional block, other threads to whom the lock is not granted have their thread identifiers added to a queue data structure. This queue data structure is associated with the classification or color of the transactional block such that conflicting threads executing different transactional blocks but which seek to alter the data associated with the current transactional block are also added to the same queue data structure. The order of thread identifiers in the queue data structure for a particular transactional block may be determined according to a prioritization scheme that takes into account the locality of the threads with regard to the thread that was granted the lock. The locality information may be obtained from the configuration data structure storage device 280.

The configuration data structure storage device 280 may store information identifying the locality of structures within the data processing system. For example, the configuration data structure storage device 280 may store information identify which processors are physically or temporally local to one another, which processors share a same cache level, or other measures of locality. Moreover, bus speeds, processor speeds, or the like, may be used to determine whether one processor is temporally local to another processor in the data processing system. Other examples of locality that can be exploited are the number of clock domain crossings between two threads, the number of chip boundary crossings between two threads, the distance in network hops between two threads, or the proximity to a shared memory controller or coherence directory between two threads. In this way, a first processor may be considered local to a second processor, e.g., because the first processor shares a same level cache with the second processor, while other processors are not considered local to the first processor. The locality of the processors may be used to determine the locality of the threads competing for access to the same classification or color associated with the transactional block.

Thus, for example, if the first thread is executing on a first processor and the second thread is executing on a second processor, if the configuration data in the configuration data structure storage device 280 indicates that the first processor is spatially or temporally local to the second processor, then the second thread may also be determined to be local to the first thread. As a result, the second thread may be given priority over other threads executing on processors that are not determined to be local to the first processor. Both spatial and temporal locality may be considered when determining how to prioritize threads in the thread queue data structure associated with the particular color or classification of the transactional block. For example, spatial locality may be used as a primary indicator of priority with temporal locality being used to decide between threads having similar spatial locality to the thread to which the lock was granted, or vice versa.

Periodically, the conflict mode control engine 260 may determine whether or not to transition the transactional block back from the second conflict resolution mode of operation to the first conflict resolution mode of operation. The determination may be made based on any number of different factors. In one illustrative embodiment, a counter may be maintained in association with the transactional block profile entry in the transactional block profile storage device 250 that identifies a number of accesses to the transactional block's color or classification that have occurred since the transactional block was transitioned to the second conflict resolution mode of operation. If this count meets or exceeds a predetermined threshold, the conflict mode control engine 260 may transition the conflict resolution mode of operation back to the first conflict resolution mode of operation, i.e. the "optimistic" mode of operation. Alternatively, such counter comparisons may be performed in response to the incrementing of the counter when an access to the classification or color has occurred, i.e. when the lock has been acquired by a thread.

In other illustrative embodiments, the controller 210 may monitor for programmatic changes in the execution of code by the processors. That is, the execution of programs typically occurs in phases. A change in phase may occur that changes the likelihood of conflicts occurring in the same transactional blocks as in a previous phase. These changes in phases of execution may be detected by the controller 210 and used as a basis to instruction the conflict mode control engine 260 to change the conflict resolution mode of operation of the transactional block from the second conflict resolution mode of operation to the first conflict resolution mode of operation.

There are several ways in which one can detect execution phase changes, however, these can be largely classified into source level and runtime level. Source level implies that either the programmer or the compiler inserts annotations in a computer program to denote phases of computation. The program structure can be used by the compiler to trigger such phases. Runtime level detection relies on monitoring program behavior and detecting changes. Current microprocessors have hardware performance monitors for a number of metrics, such as cache misses or instructions complete. Instructions complete can be used to compute the IPC (Instruction per cycle) rate. An abrupt change in either of these rates (cache misses or IPC) provides a good estimate of phase behavior changes. Another alternative is for the hardware or runtime system to monitor branching behavior and constructing traces. Traces can then be used to construct phases and detect phase changes when the program execution moves to new traces.

Thus, the illustrative embodiments provide a mechanism for handling conflicts in a transactional memory system that permits concurrent execution of transactional blocks in a first mode of operation with standard conflict resolution, but which transitions to a more restrictive conflict resolution mode of operation when a sufficient number of conflicts are detected. In this second conflict resolution mode of operation, locking mechanisms are used to control access to transactional blocks that conflict with one another with locality of threads being used to determine a priority ordering of threads competing for access to the conflicting transactional blocks.

Figure 3:
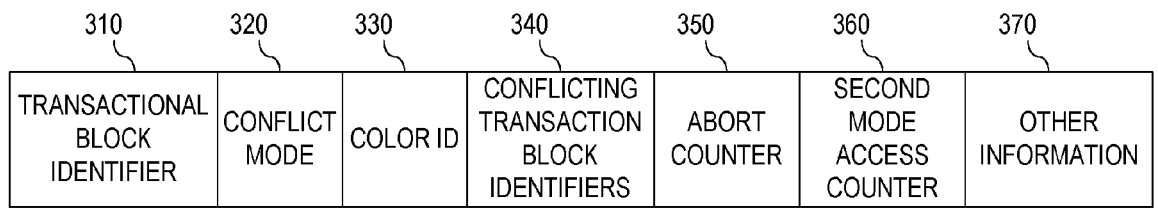
FIG. 3 is an example diagram of a transactional block profile data structure in accordance with one illustrative embodiment.

FIG. 3 is an example diagram of a transactional block profile data structure in accordance with one illustrative embodiment. As shown in FIG. 3, in this example, the transactional block profile data structure comprises a transactional block identifier 310, a conflict mode field 320, a color identifier 330, a conflicting transactional block identifiers field 340, an abort counter 350, a second mode access counter 360, and an other information field 370. Each transactional block may have an entry similar to that shown in FIG. 3 within the transactional block profile storage device 250 in FIG. 2, so that conflicts and conflict resolutions with regard to the transactional blocks may be tracked. This information may be used by the mechanisms of the illustrative embodiments, as described above, to resolve conflicts in a transactional memory system using multiple conflict resolution modes of operation.

As discussed above, each transactional block has its own transactional block identifier 310 which, in one illustrative embodiment, is an address of a first instruction in the transactional block. This transactional block identifier 310 may be used as an index into the transactional block profile storage device 250 to retrieve information from the transactional block profile entry for the corresponding transactional block.

The conflict mode field 320 includes an identifier indicating which conflict resolution mode of operation the transactional block is currently using, e.g., the first conflict resolution mode or second conflict resolution mode of operation. This field may be utilized by the mechanisms of the illustrative embodiments to determine how to handle requests for accessing this transactional block. For example, if the transactional block is currently using the first conflict resolution mode of operation, requests for access to the transactional block may not be blocked and may be allowed to access the transactional block. In the first conflict resolution mode of operation, resolution of conflicts is left up to the thread selection engine 230 which selects a thread to allow to complete its state changes and aborts other threads making conflicting state changes. However, in the second conflict resolution mode, threads requesting access to the transactional block, or threads executing transactional blocks that attempt to alter the same data as the transactional block identified by the transactional block identifier 310, may be placed in a wait queue, e.g., the thread queue data structure, for the particular color associated with the transactional block, as specified in the color identifier field 330.

The conflicting transactional block identifiers 340 provides a listing of other transactional blocks whose concurrent execution conflicts with the transactional block corresponding to the transactional block identifier 310. The identifiers in the field 340 may be the transactional block identifiers 310 of other transactional blocks having entries within the same transactional block profile storage device 250 in FIG. 2. In this way, the field 340 may provide links to other entries within the transactional block profile storage device 250. When a transactional block is determined to be a conflict with the current transactional block, the conflicting transactional block's identifier may be added to field 340. The field 340 essentially provides a listing of the identifiers of the other transactional blocks that are within the same classification or color as the current transaction block specified by the transactional block identifier 310.

The abort counter 350, as described above, is used to count the number of state change abort operations that are performed due to conflicting transactional blocks or conflict concurrent executions of the same transactional block identified by the transactional block identifier 310. This counter is incremented, when the transactional block is operating in the first conflict resolution mode of operation as identified by the field 320, with each abort operation until the counter value meets or exceeds a predetermined threshold. At this point, the conflict resolution mode of operation is transitioned to the second conflict resolution mode of operation, the conflict mode field 320 is updated accordingly to identify the second conflict resolution mode of operation, a color is associated with the transactional block and its corresponding identifier is updated in the field 330, and the abort counter is reinitialized. Moreover, the conflict mode fields 320 and color identifiers 330 of transactional block profile entries corresponding to transactional blocks specified in the conflicting transactional block identifiers field 340 may be updated to have the same conflict resolution mode of operation and color identifier.

In the second conflict resolution mode of operation, the second mode access counter 360 is used to determine a number of times transactional blocks of the particular color assigned to the current transaction block have been accessed. The second mode access counter 360 is incremented, for example, each time a thread completes execution of a transactional block having the corresponding color specified in field 330. Alternatively, the second mode access counter 360 is incremented, for example, each time a lock for the color identified in field 330 is handed off to another thread or obtained by another thread. Once this counter value meets or exceeds a predetermined threshold value, the conflict resolution mode of operation may be transitioned back to the first conflict resolution mode of operation. The other information field 370 may store other information pertinent to conflicts and conflict resolution within the transactional memory system in association with the particular transaction block specified by the transactional block identifier 310.

Figure 4:
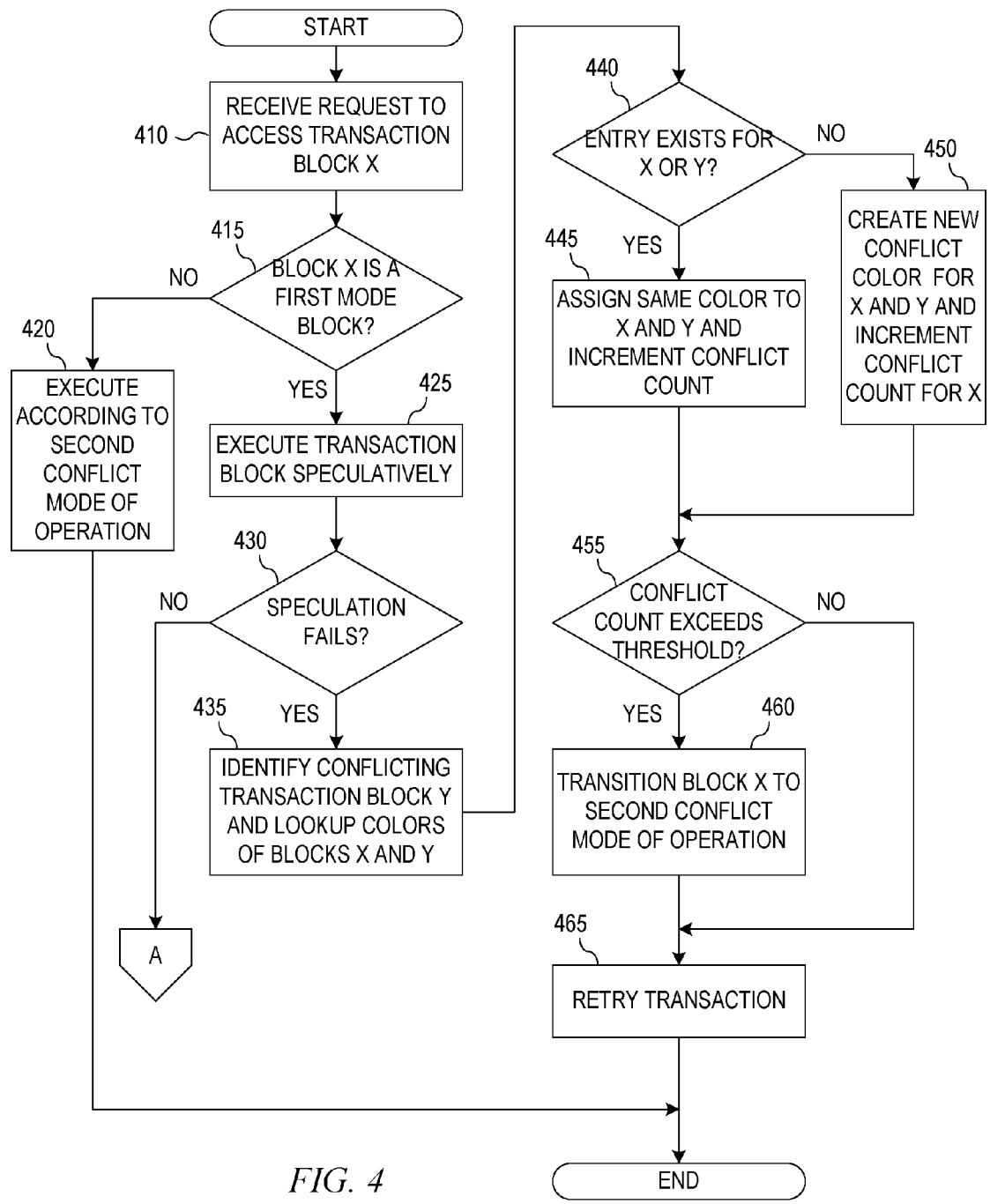
FIG. 4 is a flowchart outlining an example operation of a transactional memory system in a first mode of operation in accordance with one illustrative embodiment.
Figure 5:
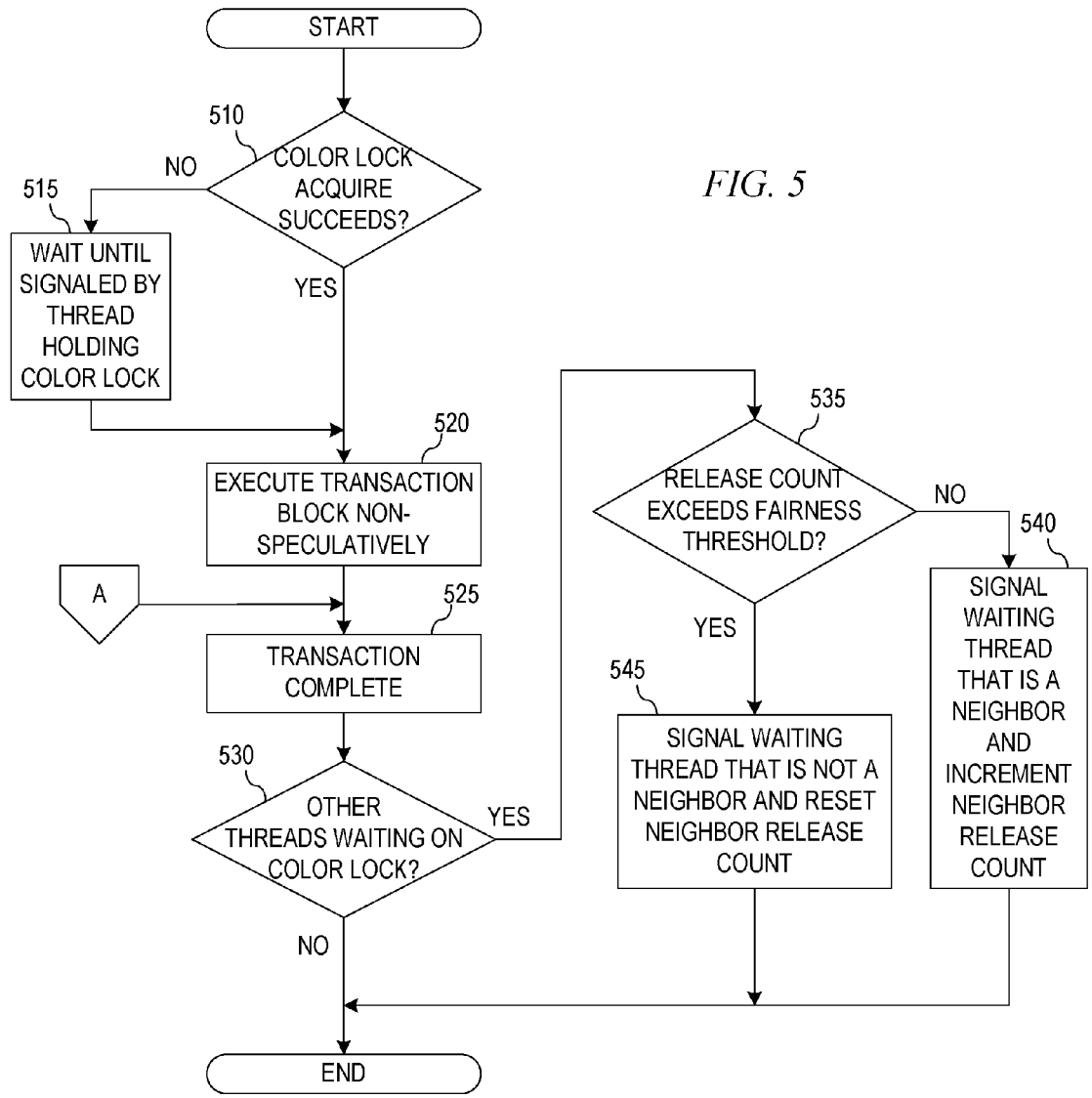
FIG. 5 is a flowchart outlining an example operation of a transactional memory system in a second mode of operation in accordance with one illustrative embodiment.

FIG. 4 is a flowchart outlining an example operation of a transactional memory system in a first mode of operation in accordance with one illustrative embodiment. FIG. 5 is a flowchart outlining an example operation of a transactional memory system in a second mode of operation in accordance with one illustrative embodiment. In one illustrative embodiment, the operations outlined in FIGS. 4 and 5 may be implemented using a transactional memory system implementing the mechanisms of the illustrative embodiments described above. For example, various ones of the operations set forth in FIGS. 4 and 5 may be performed by the operational elements shown in FIG. 2 utilizing the transactional block profile entries of the type shown in FIG. 3.

With reference now to FIG. 4, the operation starts when a request to access a transactional block X is received (step 410). A determination is made as to whether the transactional block X is currently in a first conflict resolution mode of operation (step 415). If not, the access request is executed in accordance with a second conflict resolution mode of operation as described hereafter in conjunction with FIG. 5 (step 420). If the transactional block X is not currently operating in the first conflict resolution mode of operation, then the transactional block X is executed speculatively (step 425).

In speculative execution, the changes to state that the thread executing the transactional block X makes may be aborted or rolled back if a conflict is encountered and another thread is selected to have its state changes persisted. Thus, a determination is made as to whether the speculative execution of the transactional block X fails or not, i.e. is aborted (step 430). If the speculative execution does not fail, the operation continues to step 525 in FIG. 5, described hereafter. Otherwise, if the speculative execution of the transactional block does fail, the conflicting transactional block Y is identified and a lookup of colors of the transactional blocks X and Y is performed (step 435).

A determination is made as to whether a color entry exists for transactional blocks X or Y in the transactional blocks' corresponding transactional block profile entry (step 440). If not, a new conflict color is assigned to transactional blocks X and Y and a conflict counter is incremented for transactional block X (step 450). This conflict counter may be, for example, the abort counter 350 in FIG. 3. If a color entry already exists for one of the transactional blocks X or Y, then both transactional blocks are assigned the same already existing color (step 445).

A determination is made as to whether the conflict count exceeds a predetermined threshold (step 455). If so, then the transactional block X is transitioned to the second conflict resolution mode of operation (step 460). Thereafter, or if the conflict count does not exceed the threshold, the transaction is retried (step 465) and the operation terminates.

With reference now to FIG. 5, in a second conflict resolution mode of operation, a determination is made as to whether an acquisition of the color lock for the color corresponding to the transactional block succeeds or not (step 510). If the acquisition does not succeed, then the thread must wait until it is signaled by the thread holding the color lock (step 515). Thereafter, or if the acquisition succeeds, the transaction block is executed non-speculatively (step 520). The transaction completes (step 525) and a determination is made as to whether there are other threads waiting for the color lock (step 530). If not, the operation terminates.

If there are additional threads waiting for the color lock, a determination is made as to whether a release count exceeds a fairness threshold (step 535). For example, the release count may be the value of the second mode access counter 360 in FIG. 3 corresponding to the transactional block. If this value does not exceed a predetermined fairness threshold, then a waiting neighbor thread is signaled and the release count is incremented (step 540). The determination of the neighbor thread to signal may be performed based on the thread queue data structure 270 in FIG. 2 by the thread selection engine 230, for example. If the release count does exceed the fairness threshold, then a non-neighbor thread may be signaled and the release count may be reset to an initial value (step 545). Thereafter, the operation terminates.

While not explicitly shown in FIG. 5, the second conflict resolution mode of operation may be exited on a periodic basis when the conflict mode control engine 260 in FIG. 2 determines that conditions warrant a transition back to the first conflict resolution mode of operation. In one illustrative embodiment, such a transition back to the first conflict mode of operation may be performed in response to step 545 in FIG. 5 where the release count does exceed the threshold. In other illustrative embodiments, while the release count may exceed the fairness threshold, this does not necessarily result in the conflict resolution mode of operation being transitioned but only results in a non-neighbor thread being selected from the thread queue data structure rather than a neighbor thread.

Thus, the illustrative embodiments provide mechanisms for handling conflicts in a transactional memory system. With the mechanisms of the illustrative embodiments, the negative effects of speculative execution of conflicting transactional blocks are minimized while still allowing for some measure of speculation by providing a plurality of conflict resolution modes of operation. Moreover, the illustrative embodiments further improve the performance of the transactional memory system by taking into account the locality of threads when determining which threads are to be provided with access to conflicting transactional blocks during a non-speculative conflict resolution mode of operation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system having a plurality of processors and a memory, for handling conflicts in a transactional memory system, comprising:
   executing, by the plurality of processors, threads in the data processing system in a first conflict resolution mode of operation in which the threads execute conflicting transactional blocks speculatively;
   determining, by a processor of the plurality of processors, for a transactional block, whether the first conflict resolution mode of operation is to be transitioned to a second conflict resolution mode of operation in which the threads accessing the conflicting transactional blocks are executed serially and non-speculatively;
   executing, by the processor, a thread that accesses the transactional block using the second conflict resolution mode of operation in response to the determination indicating that the first conflict resolution mode of operation is to be transitioned to the second conflict resolution mode of operation; and
   determining whether or not to transition the transactional block back from the second conflict resolution mode of operation to the first conflict resolution mode of operation, wherein the determining whether or not to transition the transactional block back from the second conflict resolution mode of operation to the first conflict resolution mode of operation comprises:
      maintaining, in the transactional block profile entry, a transition counter identifying a number of accesses to transactional blocks having a same classification associated with the transactional block that have occurred since the transactional block was transitioned to the second conflict resolution mode of operation;
      determining whether the transition counter has a value that meets or exceeds a predetermined threshold; and
      transitioning the transactional block from the second conflict resolution mode of operation to the first conflict resolution mode of operation in response to the transition counter having the value that meets or exceeds the predetermined threshold.

2. The method of claim 1, further comprising:
   receiving a first request for access to the transactional block from a first thread executing on a first processor; and
   generating a transactional block profile entry in a profile data structure, for the transactional block, wherein the transactional block profile entry comprises a transactional block identifier and one or more abort counters for counting a number of times a thread executing the transactional block has had to be aborted due to a conflict with another thread executing the transactional block, or accessing a same portion of data as the transactional block, at substantially a same time.

3. The method of claim 2, further comprising:
detecting a conflict between the first thread or a second thread, wherein the conflict is due to a second request attempting to either access the same transactional block as the first thread or modify a same portion of data as the first thread;
resolving the conflict by selecting one of the first thread or the second thread to allow to persist first state changes or first modifications to the same portion of data while second state changes or second modifications to the same portion of data made by a non-selected one of the first thread or the second thread are not persisted; and
incrementing an abort counter, in the one or more abort counters of the transactional block profile entry, based on the resolution of the conflict.

4. The method of claim 3, further comprising:
storing in the transactional block profile entry, a transactional block identifier of a conflicting transactional block executed by the second thread responsive to the transactional block executed by the second thread is different from the transactional block executed by the first thread.

5. The method of claim 3, wherein the determining for the transactional block, whether the first conflict resolution mode of operation is to be transitioned to the second conflict resolution mode of operation comprises:
comparing at least one abort counter value of the one or more abort counter values to a predetermined threshold; and
transitioning the first conflict resolution mode of operation to the second conflict resolution mode of operation in response to the at least one abort counter value being equal to or greater than the predetermined threshold.

6. The method of claim 2, further comprising:
assigning a classification having a classification identifier to the transactional block in response to the first conflict resolution mode of operation being transitioned to the second conflict resolution mode of operation;
storing the classification identifier in the transactional block profile entry.

7. The method of claim 6, wherein the classification and classification identifier assigned to the transactional block is the same classification and classification identifier of a conflicting transactional block responsive to the conflicting transactional block already having an associated classification and classification identifier, or is a new unique classification and new unique classification identifier responsive to the conflicting transactional block does not already having an associated classification and classification identifier.

8. The method of claim 6, wherein, under the second conflict resolution mode of operation, transactional blocks having the same classification and a same classification identifier are executed serially with regard to one another.

9. The method of claim 8, wherein for threads accessing transactional blocks having the same classification and the same classification identifier, the threads must obtain a lock associated with the same classification and the same classification identifier before being permitted to access a corresponding transactional block, and wherein once a thread obtains the lock associated with the same classification and the same classification identifier, the thread may access any transactional block having that same classification and the same classification identifier.

10. The method of claim 9, wherein the lock is released by an active thread to be obtained by a waiting thread, in a thread queue associated with the same classification and same classification identifier, in response to the active thread completing execution of its corresponding transactional block, and wherein a priority of threads in the thread queue is determined according to at least one of a physical locality or temporal locality of the threads in the thread queue.

11. The method of claim 10, wherein the at least one of a physical locality or a temporal locality of the threads is determined based on information stored in a configuration data structure.

12. The method of claim 10, wherein the at least one of a physical locality or a temporal locality of the threads is determined according to one of
whether or not processors executing the threads share a same cache level;
bus speeds associated with processors executing the threads;
processor speeds of processors executing the threads;
a number of clock domain crossings between the threads;
a number of chip boundary crossings between the threads;
a distance in network hops between the threads; or
a proximity to a shared memory controller or coherence directory between the threads.

13. The method of claim 1, wherein the determining whether or not to transition the transactional block back from the second conflict resolution mode of operation to the first conflict resolution mode of operation comprises:
monitoring the programmatic changes in execution of code by the plurality of processors; and
transitioning the transactional block back from the second conflict resolution mode of operation to the first conflict mode of operation in response to a programmatic change in execution code by the plurality of processors being detected.

14. The method of claim 13, wherein the programmatic changes in execution of code by the plurality of processors comprises a change in execution phase of code, wherein the change in execution phase of code is identified by one of annotations inserted into the code by a programmer or compiler to denote phases of computation, or runtime hardware performance monitors identifying one of a number of cache misses, instructions complete, or branching behavior.

15. A computer program product comprising a non-transitory computer readable storage medium having a computer readable program recorded thereon, wherein the computer readable program, when executed on a data processing system, causes the data processing system to:
execute threads, in the data processing system, in a first conflict resolution mode of operation in which the threads execute conflicting transactional blocks speculatively;
determine, for a transactional block, whether the first conflict resolution mode of operation is to be transitioned to a second conflict resolution mode of operation in which the threads accessing the conflicting transactional blocks are executed serially and non-speculatively;
execute a thread that accesses the transactional block using the second conflict resolution mode of operation in response to the determination indicating that the first conflict resolution mode of operation is to be transitioned to the second conflict resolution mode of operation; and
determine whether or not to transition the transactional block back from the second conflict resolution mode of operation to the first conflict resolution mode of operation, wherein the computer readable program to determine whether or not to transition the transactional block back from the second conflict resolution mode of operation to the first conflict resolution mode of operation further causes the data processing system to:
maintain, in the transactional block profile entry, a transition counter identifying a number of accesses to transactional blocks having a same classification associated with the transactional block that have occurred since the transactional block was transitioned to the second conflict resolution mode of operation;
determine whether the transition counter has a value that meets or exceeds a predetermined threshold; and
transition the transactional block from the second conflict resolution mode of operation to the first conflict resolution mode of operation in response to the transition counter having the value that meets or exceeds the predetermined threshold.

16. The computer program product of claim 15, wherein the computer readable program further cause the computing device to:
receive a first request for access to the transactional block from a first thread executing on a first processor;
generate a transactional block profile entry in a profile data structure, for the transactional block, wherein the transactional block profile entry comprises a transactional block identifier and one or more abort counters for counting a number of times a thread executing the transactional block has had to be aborted due to a conflict with another thread executing the transactional block, or accessing a same portion of data as the transactional block, at substantially a same time;
detecting a conflict between the first thread and a second thread, wherein the conflict is due to a second request attempting to either access the same transactional block as the first thread or modify a same portion of data as the first thread;
resolve the conflict by selecting one of the first thread or the second thread to allow to persist first state changes or first modifications to the same portion of data while second state changes or second modifications to the same portion of data made by a non-selected of the first thread or the second thread are not persisted;
increment an abort counter, in the one or more abort counters of the transactional block profile entry, based on the resolution of the conflict; and
store in the transactional block profile entry, a transactional block identifier of a conflicting transactional block executed by the second thread responsive to the transactional block executed by the second thread is different from the transactional block executed by the first thread, wherein the determining for the transactional block, whether the first conflict resolution mode of operation is to be transitioned to the second conflict resolution mode of operation comprises:
comparing at least one abort counter value of the one or more abort counter values to a predetermined threshold; and
transitioning the first conflict resolution mode of operation to the second conflict resolution mode of operation in response to the at least one abort counter value being equal to or greater than the predetermined threshold.

17. The computer program product of claim 15, wherein the computer readable program further cause the computing device to:
receive a first request for access to the transactional block from a first thread executing on a first processor;
generate a transactional block profile entry in a profile data structure, for the transactional block, wherein the transactional block profile entry comprises a transactional block identifier and one or more abort counters for counting a number of times a thread executing the transactional block has had to be aborted due to a conflict with another thread executing the transactional block, or accessing a same portion of data as the transactional block, at substantially a same time;
assign a classification having a classification identifier to the transactional block in response to the first conflict resolution mode of operation being transitioned to the second conflict resolution mode of operation;
store the classification identifier in the transactional block profile entry, wherein:
under the second conflict resolution mode of operation, transactional blocks having the same classification and a same classification identifier are executed serially with regard to one another,
for threads accessing transactional blocks having the same classification and the same classification identifier, the threads must obtain a lock associated with the same classification and the same classification identifier before being permitted to access a corresponding transactional block,
once a thread obtains the lock associated with the same classification and the same classification identifier, the thread may access any transactional block having the same classification and the same classification identifier,
the lock is released by an active thread to be obtained by a waiting thread, in a thread queue associated with the same classification and same classification identifier, in response to the active thread completing execution of its corresponding transactional block, and
a priority of threads in the thread queue is determined according to at least one of a physical locality or temporal locality of the threads in the thread queue.

18. An apparatus, comprising:
a processor; and
a memory coupled to the processor, wherein the memory comprises instructions which, when executed by the processor, cause the processor to:
execute threads in a first conflict resolution mode of operation in which the threads execute conflicting transactional blocks speculatively;
determine, for a transactional block, whether the first conflict resolution mode of operation is to be transitioned to a second conflict resolution mode of operation in which the threads accessing the conflicting transactional blocks are executed serially and non-speculatively;
execute a thread that accesses the transactional block using the second conflict resolution mode of operation in response to the determination indicating that the first conflict resolution mode of operation is to be transitioned to the second conflict resolution mode of operation; and
determine whether or not to transition the transactional block back from the second conflict resolution mode of operation to the first conflict resolution mode of operation, wherein the instructions to determine whether or not to transition the transactional block back from the second conflict resolution mode of operation to the first conflict resolution mode of operation further causes the processor to:
maintain, in the transactional block profile entry, a transition counter identifying a number of accesses to transactional blocks having a same classification associated with the transactional block that have occurred since the transactional block was transitioned to the second conflict resolution mode of operation;

determine whether the transition counter has a value that meets or exceeds a predetermined threshold; and transition the transactional block from the second conflict resolution mode of operation to the first conflict resolution mode of operation in response to the transition counter having the value that meets or exceeds the predetermined threshold.

\* \* \* \* \*